United States Patent
Yeh et al.

(10) Patent No.: US 8,226,288 B2
(45) Date of Patent: Jul. 24, 2012

(54) BACKLIGHT MODULE

(75) Inventors: Ke-Ming Yeh, Taipei County (TW);
Ju-Yi Hsieh, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 440 days.

(21) Appl. No.: 12/609,015

(22) Filed: Oct. 30, 2009

(65) Prior Publication Data
US 2010/0296313 A1 Nov. 25, 2010

(30) Foreign Application Priority Data
May 19, 2009 (TW) ................ 98208678 U

(51) Int. Cl.
*F21V 7/04* (2006.01)
(52) U.S. Cl. ........ 362/632; 362/608; 362/609; 362/610; 362/611; 362/612
(58) Field of Classification Search .......... 362/608–612, 362/632
See application file for complete search history.

(56) References Cited

U.S. PATENT DOCUMENTS
7,229,198 B2 * 6/2007 Sakai et al. .............. 362/560

FOREIGN PATENT DOCUMENTS
TW M325685 1/2008
TW I300151 8/2008

* cited by examiner

*Primary Examiner* — Diane Lee
*Assistant Examiner* — Sean Gramling
(74) *Attorney, Agent, or Firm* — Winston Hsu; Scott Margo

(57) ABSTRACT

A backlight module includes a housing, at least a light-mixing tube, a plurality of light emitting devices, and at least a reflector. The housing includes a bottom sheet and a frame, in which the bottom sheet and the frame define a chamber. The frame is a hollow structure, and inner walls of the frame define the light-mixing tube. The light emitting devices are disposed at a light entrance of the light-mixing tube. Lights generated by the light emitting devices enter the light-mixing tube from the light entrance, mix in the light-mixing tube, and emit from a light exit of the light-mixing tube. Lights emit from the light-mixing tube are reflected at the reflector and therefore are reflected into the chamber.

13 Claims, 7 Drawing Sheets

BACKLIGHT MODULE

BACKGROUND OF THE INVENTION

1. Field of the Invention

The present utility model is related to a backlight module, and more particularly, to a backlight module that does not reserve additional spaces as its light mixing distance.

2. Description of the Prior Art

Liquid crystal display devices have advantages such as low radiation, thin profile, and low power consumption. They are widely applied in personal digital assistants (PDA), notebook computers, digital cameras, mobile phones, as well as in many other consumer electronics. Since a liquid crystal display panel is not self-luminous, a backlight module disposed at a bottom of the liquid crystal display panel is necessary for supplying a light source to the liquid crystal display panel which displays images.

Conventional backlight modules often use cold cathode fluorescent lamps (CCFL) as light sources; however, CCFL contains mercury (Hg) and other harmful substances which are difficult to recycle as well as not environmental friendly. Consumers nowadays are more aware of environment issues, driving the demand for environmental friendly electronics. With a strong demand in recyclable electronics, the mercury-containing CCFL will be gradually replaced.

In addition, prior art backlight modules are classified into an edge type or a direct type depending on the position of a light source. However, both the edge type and the direct type backlight modules require a light mixing distance to accomplish even brightness and color effects. In order to satisfy a minimum required light mixing distance, either widths of the backlight module's edges or thicknesses of the backlight modules have to be increased. As a result, volumes of the backlight modules are also increased which goes against the demand for backlight modules with thinner profiles.

SUMMARY OF THE INVENTION

In order to resolve the issue on width and thickness increases of the prior art backlight module, the present utility model provides a backlight module that does not require additional spaces for a light mixing distance which reduces the volume of the backlight module.

To achieve the above objectives, the present utility model provides a backlight module, including a housing, at least a light-mixing tube, a plurality of light emitting devices, and at least a reflector. The housing includes a bottom sheet and a frame, wherein the bottom sheet and the frame define a chamber. The light-mixing tube includes a light entrance and a light exit. The light emitting devices are disposed near a light entrance of the light-mixing tube. Lights emitted by the light emitting devices enter the light entrance and pass through the light-mixing tube. The reflector disposed near the light exit of the light-mixing tube reflects lights from the light exit to the chamber.

The light-mixing tube of the present utility model is being disposed along the frame such that light mixing is completed inside the light-mixing tube which reduces the volume and achieves thinner in profile and lighter in weight of the backlight module.

These and other objectives of the present invention will no doubt become obvious to those of ordinary skill in the art after reading the following detailed description of the preferred embodiment that is illustrated in the various figures and drawings.

DETAILED DESCRIPTION

In the following specifications and claims, certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " Also, the term "electrically connect" is intended to mean either an indirect or direct electrical connection. Accordingly, if one device is coupled to another device, that connection may be through a direct electrical connection, or through an indirect electrical connection via other devices and connections.

Figure 1:
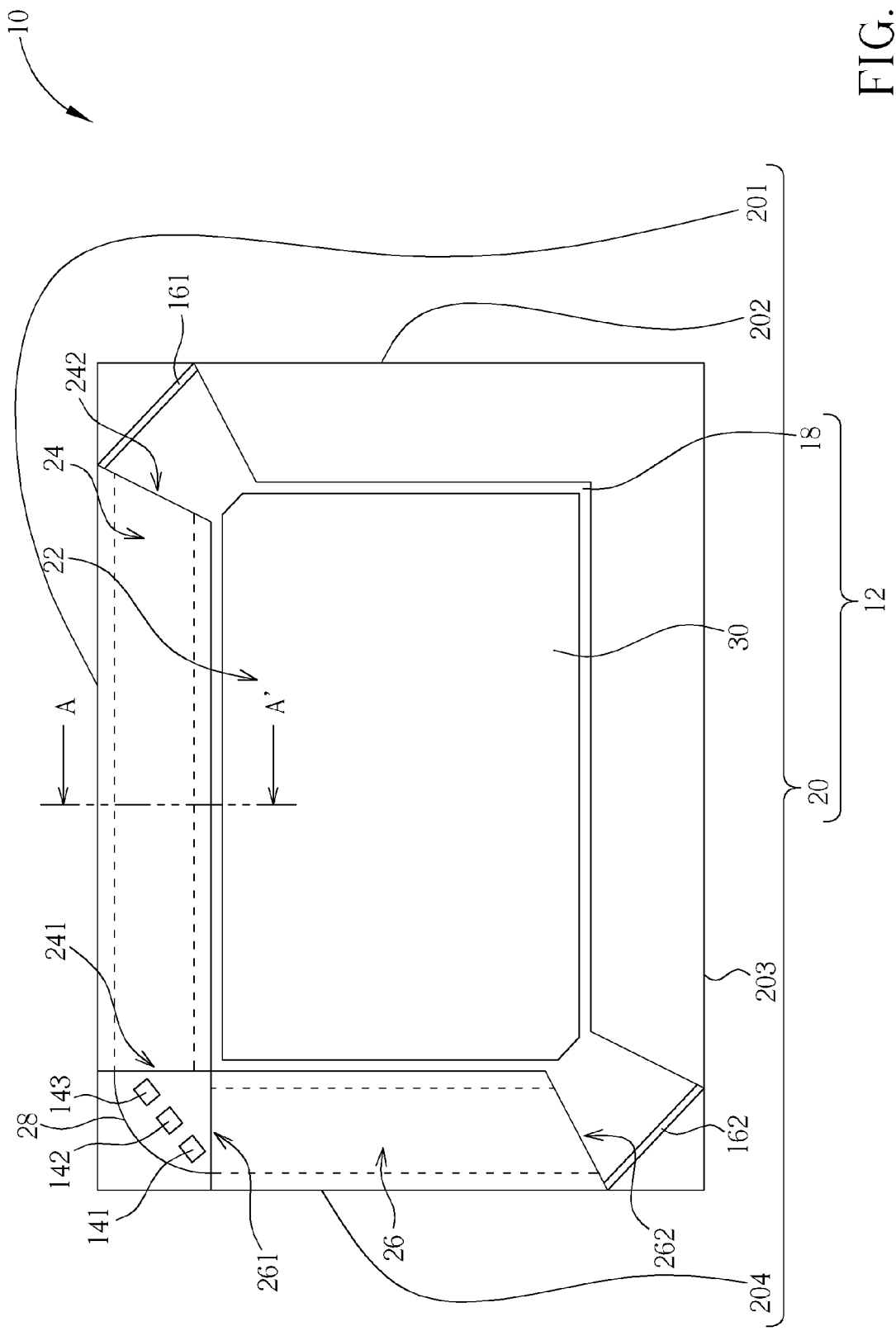
FIG. 1 is a schematic diagram illustrating a backlight module of a first preferred embodiment.
Figure 2:
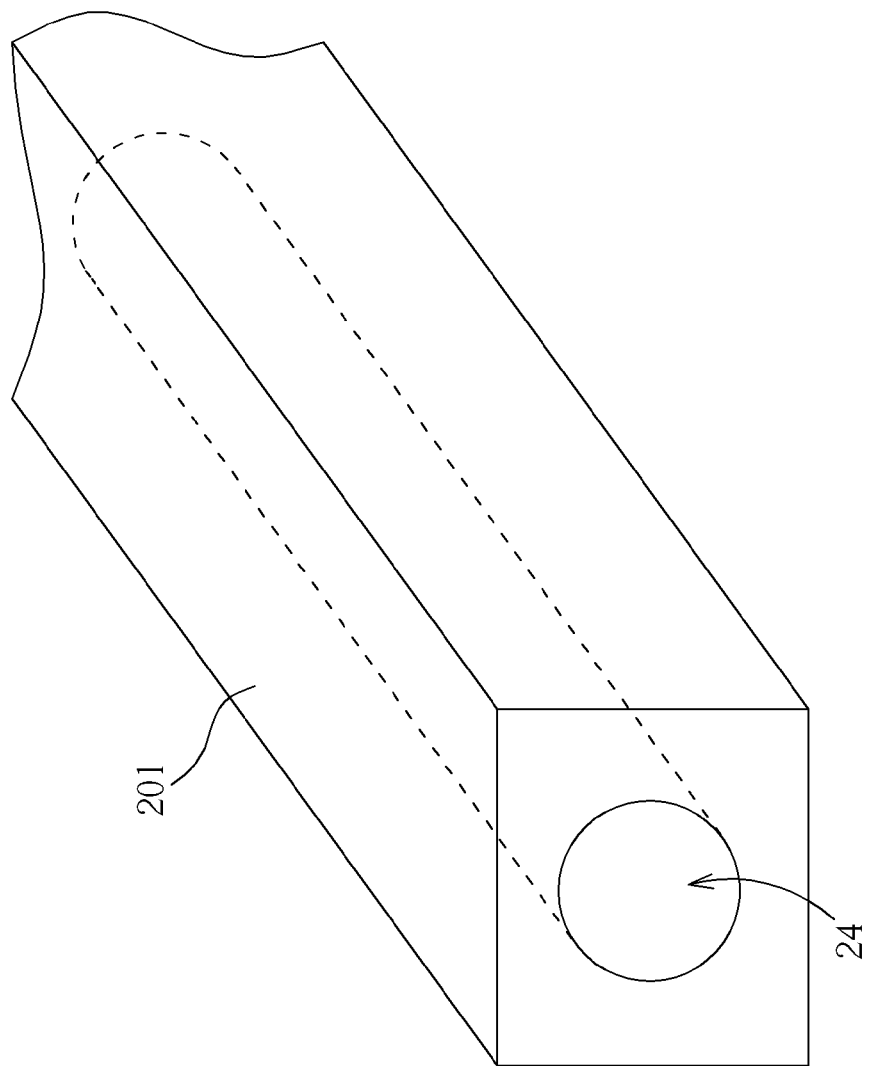
FIG. 2 is a schematic diagram illustrating a backlight module of a first preferred embodiment.
Figure 3:
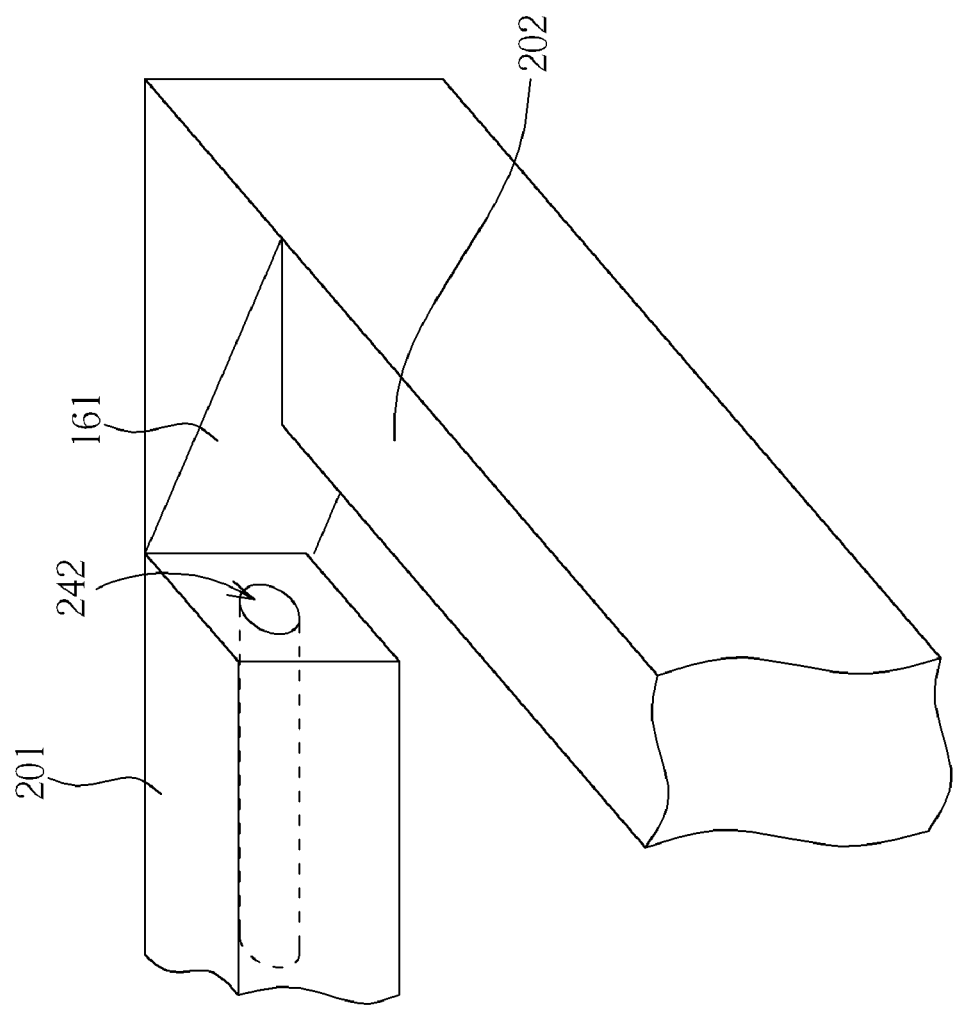
FIG. 3 is a schematic diagram illustrating a backlight module of a first preferred embodiment.

Please refer to FIG. 1 to FIG. 5. FIG. 1 to FIG. 5 are schematic diagrams illustrating a backlight module 10 of a first embodiment of the present utility model. Please refer to FIG. 1 and FIG. 2, wherein FIG. 2 is a schematic diagram of a sectional view across a line A-A' of FIG. 1. The backlight module 10 includes a housing 12, a plurality of light emitting devices 141, 142 and 143, and a plurality of reflectors 161 and 162, wherein the housing 12 includes a bottom sheet 18, and a frame 20 that is fixed above the bottom sheet 18 wherein the bottom sheet 18 and the frame 20 define a chamber 22. The frame 20 has a hollow construction and its inner walls define a light-mixing tube. In the present preferred embodiment, the frame 20 includes a first side bar 201, a second side bar 202, a third side bar 203, and a fourth side bar 20, connecting together by head to tail to form a rectangular frame. Also, as illustrated in FIG. 1 and FIG. 2, the first side bar 201 and the fourth side bar 204 of the frame 20 have hollow structures, and inner walls of the first side bar 201 define a first light-mixing tube 24 (FIG. 2) and inner walls of the fourth side bar 204 define a second light-mixing tube 26. The first light-mixing tube 24 of the first side bar 201 and the second light-mixing tube 26 of the fourth side bar 204 may perhaps be solid bars before the frame 20 is manufactured. Using a hole drilling method to remove the center portions of the first side bar 201 and the fourth side bar 204 creates the first and the second light-mixing tubes 24 and 26; however, construction of the frame 20 of the present utility model is not a limitation. In addition, the hollow structure of the first side bar 201 and the fourth side bar 204 may also be manufactured using a mold containing a hollow structure such that the second light-mixing tube 26 inside the fourth side bar 204 is created at a same time as the fourth side bar 204. The frame 20 of the present preferred embodiment has a unit body construction and is constructed using materials of fine reflective properties such as polycarbonate (PC), poly methylmethacrylate (PMMA), UV-cured resin, thermosetting resin, or other high polymer materials. Alternatively, the variation in reflective indices of different materials could also result in reflections of lights, allowing lights to reflect inside the first light-mixing tube 24 and the second light-mixing tube 26.

Figure 4:
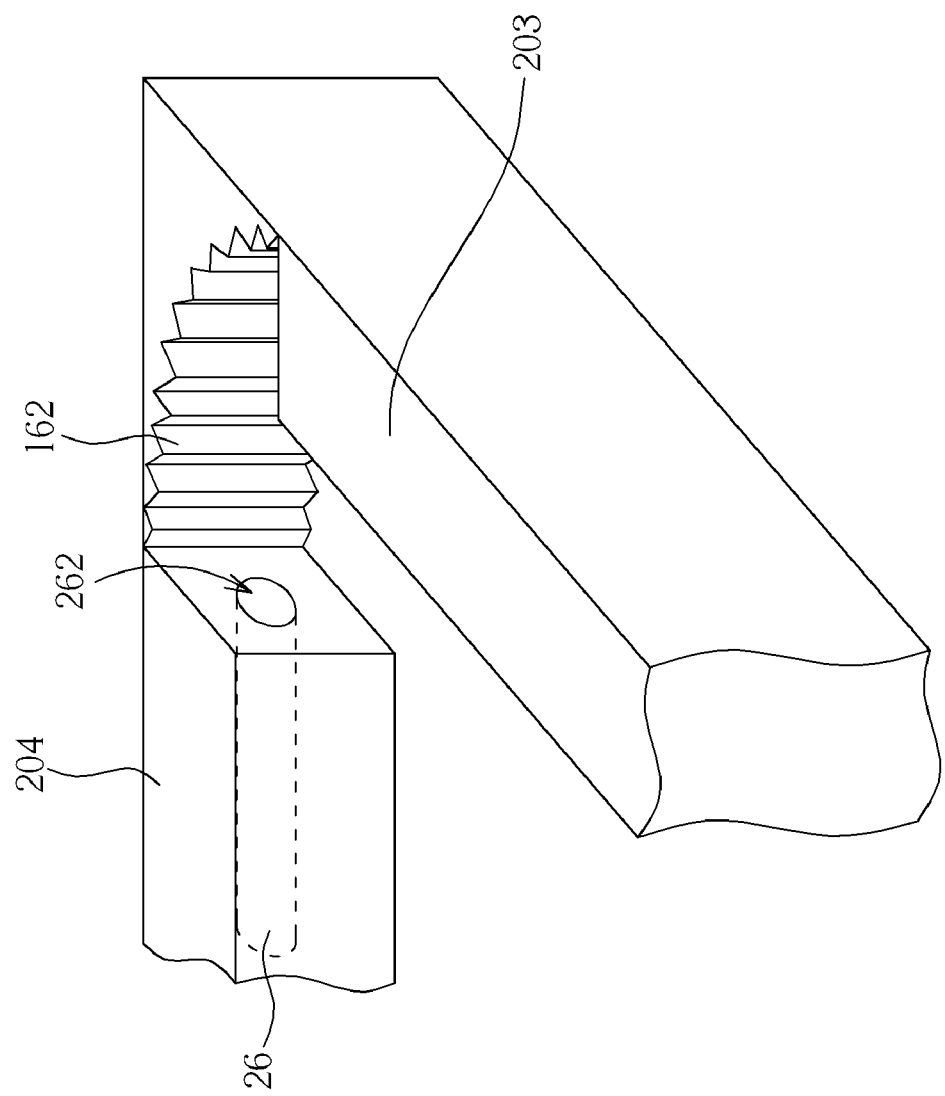
FIG. 4 is a schematic diagram illustrating a backlight module of a first preferred embodiment.
Figure 5:
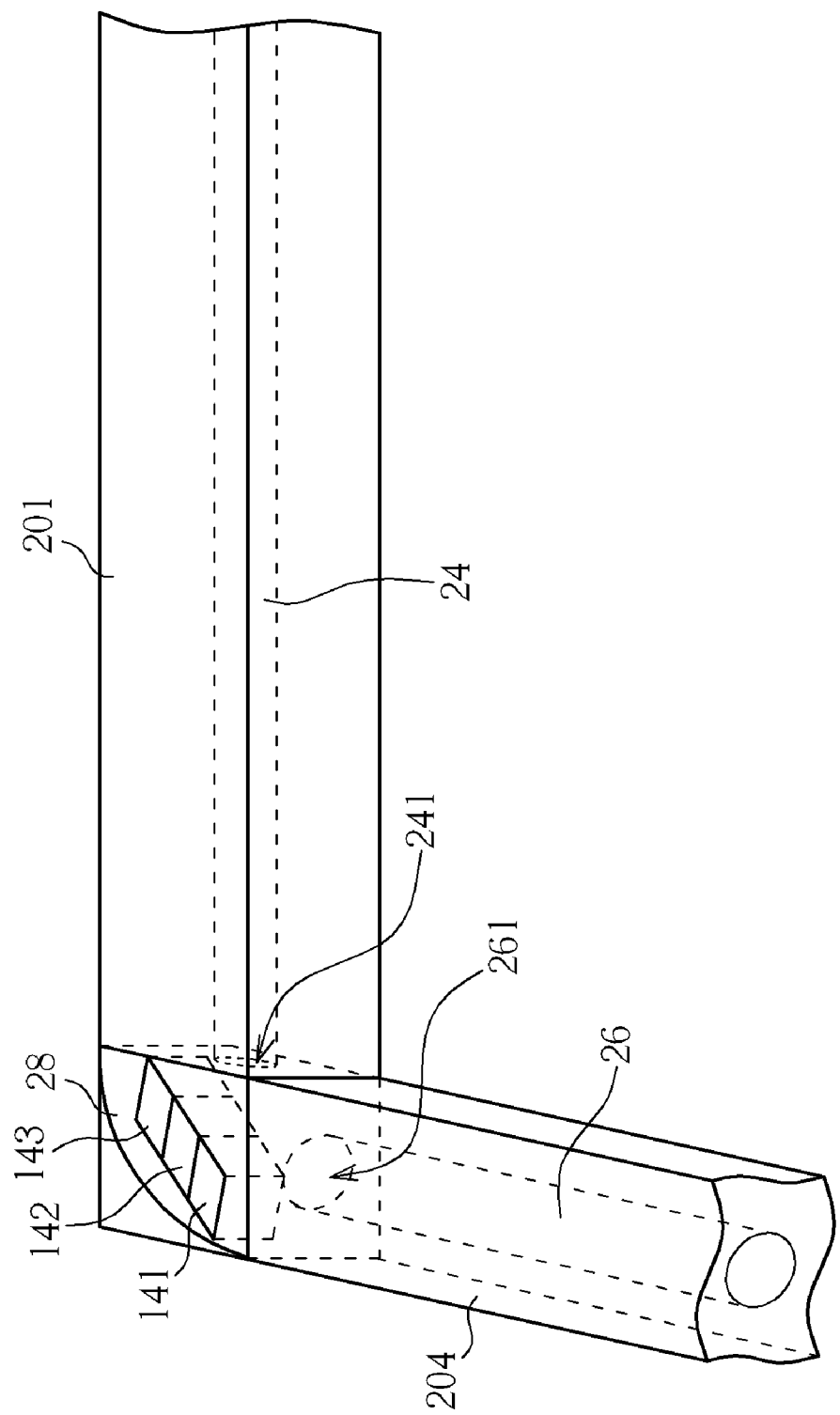
FIG. 5 is a schematic diagram illustrating a backlight module of a first preferred embodiment.

As illustrated in FIG. 1, the first light-mixing tube 24 includes a light entrance 241 and a light exit 242 disposed at two ends of the first light-mixing tube 24. The second light-mixing tube 26 includes a light entrance 261 and a light exit 262 disposed at the two ends of the second light-mixing tube 26. The light entrances 241 and 261 of the first light-mixing tube 24 and the second light-mixing tube 26 are disposed at a junction of the first side bar 201 and the fourth side bar 204. The light exit 242 of the first light-mixing tube 24 is disposed at a junction of the first side bar 201 and the second side bar 202. Please refer to FIG. 1, FIG. 3 and FIG. 4, wherein a reflector 161 is disposed at a junction of the first side bar 201 and the second side bar 202 and the surface of the reflector 161 may deposit a metallic or a TiO$_2$ thin film. The reflector 161 of the present preferred embodiment has a smooth surface and it forms an angle with the first side bar 201 where the degree of the angle may be adjusted; however surface finishes do not limit in this preferred embodiment of the present utility model. As illustrated in FIG. 4, a reflector 161 has a rough and curved surface which enhances reflection of lights. The light exit 262 of the second light-mixing tube 26 is disposed at a junction of the third side bar 203 and the fourth side bar 204. Also, a reflector 162 is disposed at a junction of the third side bar 203 and the fourth side bar 204. As a result, light exits 242 and 262 face reflectors 161 and 162 respectively and lights coming out of the light exits 242 and 262 are reflected by the reflectors 161 and 162 to the chamber 22. Please refer to FIG. 1 and FIG. 5, the light emitting devices 141, 142 and 143 of the present preferred embodiment are light-emitting diodes (LEDs) disposed at a junction of the first side bar 201 and the fourth side bar 204, including a red LED, a green LED, and a blue LED, but is not a limitation. The light emitting devices 141, 142 and 143 may also be laser diodes (LD) or other light emitting devices of low pollutants. As illustrated in FIG. 5, the light emitting devices 141, 142 and 143 face the light entrances 241 and 261 of the first light-mixing tube 24 and the second light-mixing tube 26. On the back of the light emitting devices 141, 142 and 143 and opposite of the light entrances 241 and 261 is a light guide panel 28 with a smooth curved surface as illustrated in FIG. 1 which reflects all other incoming lights to the light entrances 241 or 261 preserving the lights emitted by the light emitting devices 141, 142 and 143. The light guide panel 28 does not limit to a smooth curved surface, it may as well be a rough surface with a plurality of small protrusions. Therefore the lights emitted by the light emitting devices 141, 142 and 143 reflect into the light entrance 241 of the first light-mixing tube 24 and then the lights are mixed to become a white light which passes through the first light-mixing tube and reaches the light exit 242. The white light is then reflected on the surface of the reflector 161 and is guided to the chamber 22. Similarly, lights emitted by the light emitting devices 141, 142 and 143 also enter the light entrance 261 of the second light-mixing tube 26. The lights are then mixed to become a white light inside the second light-mixing tube 26 and the white light is reflected to the chamber 22 through the reflector 162 disposed at the light exit 262. Moreover, a light guide panel 30 could further be disposed in the chamber 22; white lights guided to the chamber are redirected through the light guide panel 30 to other parts that require white lights.

Figure 6:
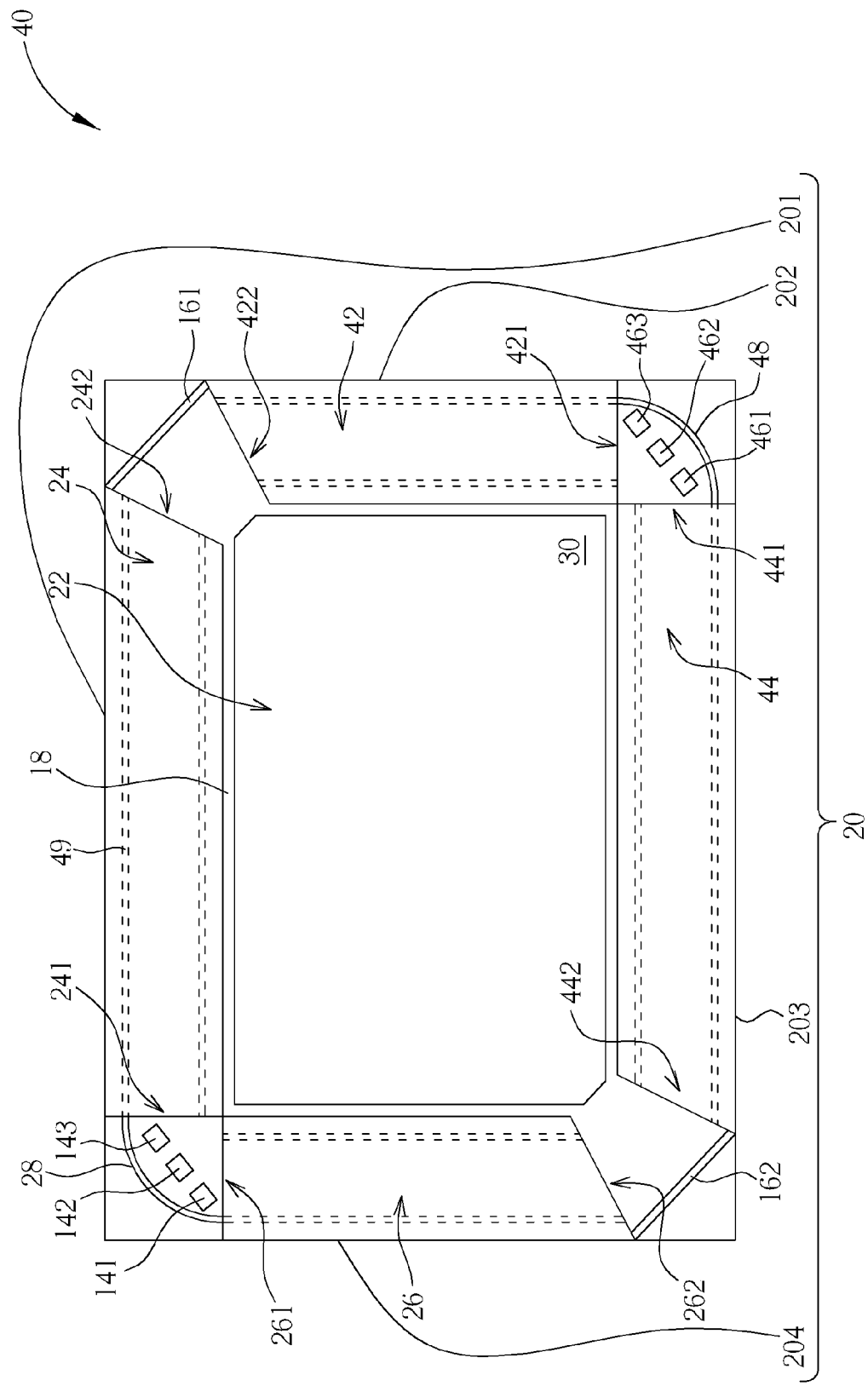
FIG. 6 is a schematic diagram illustrating a backlight module of a second preferred embodiment.

Please refer to FIG. 6. FIG. 6 is a schematic diagram illustrating a backlight module 40 of a second preferred embodiment. Different from the first preferred embodiment, the present preferred embodiment has a third light-mixing tube 42 disposed at a junction of the second side bar 202 and the third side bar 203. Also, a plurality of light emitting devices 461, 462 and 463 are disposed at a junction of the second side bar 202 and the third side bar 203, such as a red LED, a green LED, and a blue LED. Similar to the first preferred embodiment, a light entrance 421 and a light exit 422 are disposed at two ends of the third light-mixing tube 42. A light entrance 441 and a light exit 442 are disposed at two ends of the fourth light-mixing tube 44. The light entrance 421 of the third light mixing tube 42 and the light entrance 441 of the fourth light-mixing tube 44 are both disposed at a junction of the second side bar 202 and the third side bar 203, facing the light emitting devices 461, 462 and 463. Also, on the back of the light emitting devices 461, 462 and 463 and opposite of the light entrances 421 and 441 is a light guide panel 48 which further reflects the lights emitted by the light emitting devices 461, 462 and 463. In addition, in order to increase the efficiency of reflections, the surfaces of the light guide panels 28 and 48 are disposed with a reflective thin film 49 such as a TiO$_2$ or a metallic thin film. The reflective thin film 49 may also be disposed at inner walls of the first light-mixing tube 24, the second light-mixing tube 26, the third light-mixing tube 42 and the fourth light-mixing tube 44, to further enhance reflections of lights inside the light-mixing tubes. Similar to the first preferred embodiment, FIG. 6 illustrates the backlight module 40 reflecting the lights emitted by the light emitting devices 461, 462 and 463 to the third light-mixing tube 42. The lights are mixed to become a white light and the white light is then delivered to the light exit 422. The white light coming out of the light exit 422 is reflected to the chamber 22 by the reflector 161 at a junction of the first side bar 201 and the second side bar 202. Similarly, lights emitted by the light emitting devices 461, 462 and 463 enter the light entrance 441 of the fourth light-mixing tube 44. The lights are then mixed and become a white light in the fourth light-mixing tube 44. Once the white light exits from the light exit 442, it is reflected to the chamber 22 by the reflector 162.

Figure 7:
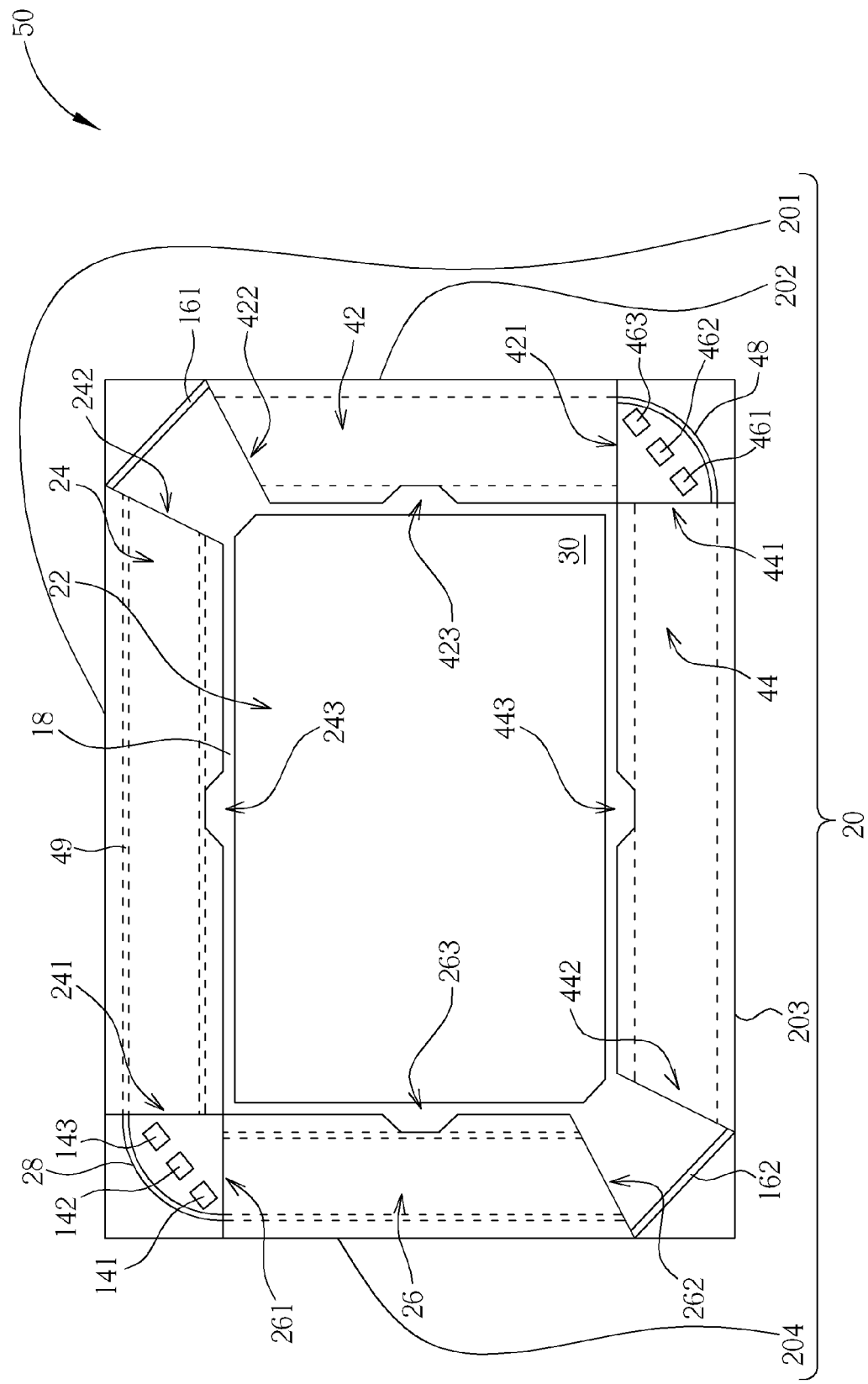
FIG. 7 is a schematic diagram illustrating a backlight module of a third preferred embodiment.

Please refer to FIG. 7. FIG. 7 is a schematic diagram illustrating a backlight module 50 of a third preferred embodiment. Similar to the first preferred embodiment, the backlight module 50 disposes a first light-mixing tube 24, a second light-mixing tube 26, a third mixing tube 42 and a fourth mixing tube 44 in a frame 20. As illustrated in FIG. 7, a light entrance 241 and a light exit 242 are disposed at two ends of the first light-mixing tube 24. In addition, a second light exit 243 is disposed between the light entrance 241 and the light exit 242 such that lights mixed in the first light-mixing tube 24 not only exit from the light exit 242, but also exits from the second light exit 243 in the middle section of the first light-mixing tube 24. The lights exit from the second light exit 243 are also guided to the chamber 22. Furthermore, the second light-mixing tube 26, the third light-mixing tube 42 and the fourth light mixing tube 44 of the backlight module 50 each contains a corresponding second light exits 263, 423, or 443 respectively. Lights mixed in the second light-mixing tube 26, the third light-mixing tube 42, and the fourth light-mixing tube 44 are also guided to the chamber 22 through its corresponding second light exits 263, 423, or 443.

In summary, the backlight module of the present utility model utilizes LEDs as its light source and the light-mixing tubes as its light-mixing distances. The lights emitted by the LEDs are mixed in the light-mixing tubes to become white lights and the white lights are guided to the chamber by the reflectors. As a result, it is not necessary for the present utility model to reserve a light-mixing distance in the chamber and width of the backlight module could be greatly reduced. Once the backlight module combines with the liquid crystal display panel, edge widths of a non-display region of the liquid crystal display device could be reduced as well, achieving a narrow frame liquid crystal display device that is more practical. In addition, the present preferred embodiments utilize LEDs as the light sources which avoid the recycle difficulties of mercury and are less harmful to the environment. The positions of the light emitting devices of the present utility model do not limit to just one side of the light-mixing tubes; the light emitting devices could also be disposed at middle sections of the light-mixing tubes which emit lights toward the light exits disposed at two ends of each light-mixing tube. Moreover, light exits of the light-mixing tubes do not limit to just the two ends of the light-mixing tube. Depending on the necessity, one or more light exits may be disposed at any section along the light-mixing tubes.

Those skilled in the art will readily observe that numerous modifications and alterations of the device and method may be made while retaining the teachings of the invention.

What is claimed is:

1. A backlight module comprising:
   a housing comprising a bottom sheet and a frame, wherein the bottom sheet and the frame define a chamber, the frame comprises a first side bar, a second side bar, a third side bar, and a fourth side bar connecting in sequence to form a rectangular shape, and the first side bar has a hollow structure;
   a first light-mixing tube defined by inner walls of the first side bar and disposed above the bottom sheet and along the frame, wherein the first light-mixing tube comprises a light entrance and a light exit;
   a plurality of light emitting devices disposed outside the first light-mixing tube and facing the light entrance of the first light-mixing tube, wherein light emitted by the light emitting devices enters the light entrance, goes along a direction parallel to the first side bar, and reaches the light exit through the first light-mixing tube; and
   at least a reflector disposed outside the first light-mixing tube and facing the light exit of the first light-mixing tube, reflecting light emitted from the light exit to the chamber.

2. The backlight module of claim 1, wherein the light emitting devices are disposed at a junction of the first side bar and the fourth side bar.

3. The backlight module of claim 1, wherein the reflector is disposed at a junction of the first side bar and the second side bar.

4. The backlight module of claim 1, wherein the fourth side bar has a hollow structure and inner walls of the fourth side bar define a second light-mixing tube.

5. The backlight module of claim 4, wherein the second light-mixing tube comprises a light exit disposed at a junction of the third side bar and the fourth side bar.

6. The backlight module of claim 5, wherein the backlight module further comprises a second reflector disposed outside the second light-mixing tube and facing the light exit of the second light-mixing tube, reflecting light emitted from the light exit to the chamber.

7. The backlight module of claim 4, wherein the second side bar has a hollow structure and inner walls of the second side bar define a third light-mixing tube.

8. The backlight module of claim 7, wherein the third light-mixing tube comprises a light exit, disposed at a junction of the second side bar and the third side bar.

9. The backlight module of claim 7, wherein the third side bar has a hollow structure, and inner walls of the third side bar define a fourth light-mixing tube.

10. The backlight module of claim 9, wherein the fourth light-mixing tube comprises a light exit, disposed at a junction of the third side bar and the fourth side bar.

11. The backlight module of claim 1, wherein the light emitting devices comprise a red color LED, a blue color LED, and a green LED.

12. The backlight module of claim 1 further comprising a reflective thin film, disposed at a side wall of the first light-mixing tube.

13. The backlight module of claim 1, wherein the frame has a unit body construction.

* * * * *